(12) United States Patent
Hindsberg

(10) Patent No.: US 9,274,813 B2
(45) Date of Patent: Mar. 1, 2016

(54) CUSTOMIZABLE FREQUENCY CONVERTER

(75) Inventor: Anders Hindsberg, Sipoo (FI)

(73) Assignee: ABB TECHNOLOGY OY, Helsinki (FI)

( * ) Notice: Subject to any disclaimer, the term of this patent is extended or adjusted under 35 U.S.C. 154(b) by 2785 days.

(21) Appl. No.: 11/667,826

(22) PCT Filed: Nov. 15, 2005

(86) PCT No.: PCT/FI2005/050411
§ 371 (c)(1),
(2), (4) Date: Oct. 17, 2007

(87) PCT Pub. No.: WO2006/053945
PCT Pub. Date: May 26, 2006

(65) Prior Publication Data
US 2008/0092135 A1 Apr. 17, 2008

(30) Foreign Application Priority Data
Nov. 16, 2004 (FI) ..................................... 20045440

(51) Int. Cl.
*G06F 9/44* (2006.01)
*G06F 9/445* (2006.01)

(52) U.S. Cl.
CPC ........ *G06F 9/44521* (2013.01); *G06F 9/44505* (2013.01)

(58) Field of Classification Search
CPC .................................................. G06F 9/44505
USPC ................. 717/101–178; 700/18, 86; 702/65; 713/1; 719/331; 714/725; 324/118–119; 326/39
See application file for complete search history.

(56) References Cited

U.S. PATENT DOCUMENTS 4,993,018 A * 2/1991 Hajikano .............. H04L 49/254
370/392
5,136,709 A 8/1992 Shirakabe et al.
(Continued)

FOREIGN PATENT DOCUMENTS

DE 196 33 990 A1 2/1998
DE 198 51 531 A1 6/2000
(Continued)

OTHER PUBLICATIONS

Usability and user centered methods for frequency converter software tools development—Helsinki University of Technology Department of Computer Science and Engineering—Antti Kangas; May 17, 2005.*
(Continued)

*Primary Examiner* — Jason Mitchell
*Assistant Examiner* — Francisco Aponte
(74) *Attorney, Agent, or Firm* — Buchanan Ingersoll & Rooney PC

(57) ABSTRACT

A frequency converter (100) comprises a processor (102), memory (104) and basic software (106) in the memory, the execution of which software implements the basic functionality of the frequency converter. For application-specific customization, the memory of the frequency converter is arranged to include application software (108) that contains callable functions (210) and is installable separately from the basic software. The frequency converter is arranged to execute the basic software (106) and the application software (108) with the same processor (102). The basic software (106) calls a function of the application software and/or provides functions of its own to be called by the application software indirectly via a link (240$_k$) in a call table (240), the location of the link in the call table being independent of the location of the function (210) corresponding to the link in the memory.

8 Claims, 3 Drawing Sheets

(56) References Cited

U.S. PATENT DOCUMENTS

| | | | |
|---|---|---|---|
| 5,175,828 A | 12/1992 | Hall et al. | |
| 5,778,226 A | 7/1998 | Adams et al. | |
| 5,797,015 A * | 8/1998 | Daniels et al. | 717/163 |
| 5,828,576 A * | 10/1998 | Loucks et al. | 702/65 |
| 6,154,878 A | 11/2000 | Saboff et al. | |
| 6,408,432 B1 * | 6/2002 | Herrmann et al. | 717/139 |
| 6,594,246 B1 * | 7/2003 | Jorgensen | H04L 1/20 370/338 |
| 7,225,037 B2 * | 5/2007 | Shani | 700/18 |
| 2003/0101290 A1 | 5/2003 | Lin et al. | |
| 2003/0110463 A1 | 6/2003 | Kuhlmann et al. | |
| 2004/0218569 A1 * | 11/2004 | Pedersen | H04W 16/28 370/334 |

FOREIGN PATENT DOCUMENTS

| | | |
|---|---|---|
| EP | 0 738 966 A2 | 10/1996 |
| EP | 0 813 131 A1 | 12/1997 |

OTHER PUBLICATIONS

Nierstrasz, et al, "A component model for field devices" Proceedings First International IFIP/ACM Working Conference on Component Deployment, ACM, Berlin, Germany, Jun. 2002.

Genssler, Zeidler, "Rule-driven component composition for embedded systems", In 4th ICSE Workshop on Component-Based Software Engineering: Component Certification and System Prediction, ICSE 2001.

Bhatia, et al, "Remote customization of systems code for embedded devices", EMSOFT'04 (Pisa, Italy), Sep. 27-29, 2004.

Finnish Search Report.

IBM Technical Disclosure Bulletin vol. 30 No. 9 Feb. 1988.

International Search Report.

Office Action dated Aug. 27, 2010, issued in the corresponding European Patent Application No. 05 811 285.5-2211.

* cited by examiner

CUSTOMIZABLE FREQUENCY CONVERTER

BACKGROUND OF THE INVENTION

The invention relates to a frequency converter comprising a processor and a memory. Frequency converters are generally used in connection with electric motors.

An entity formed of a frequency converter and an electric motor is often incorporated into a surrounding system that gives commands to the frequency converter and may receive response signals from it. To be incorporated into the surrounding system, the frequency converter comprises software. The software is usually stored in a non-volatile memory. It controls the processor to implement the basic functions of the frequency converter in response to input signals coming from outside. The basic functions can be considered to include the critical tasks in respect of the electric motor, such as starting, switching off and speed control of the motor as well as possible fault and/or safety control. In addition to speed, the controlled variables may include frequency, torque, location and power. In inverter use, there may be other controlled variables as well. With respect to this invention, the only essential thing is that the frequency converter has given basic functionality provided by the manufacturer and generated by a processor in the control of basic software. Defining the basic functionality in detail is not essential from the viewpoint of the invention.

The general tendency towards large production runs necessitates standard frequency converters with standard basic software, irrespective of the customer or application. On the other hand, the basic software of a frequency converter is not necessarily applicable to be incorporated into the surrounding system. For example, the signalling protocol (command language) of the surrounding system may be different from that of the basic software of the frequency converter.

It is not probable that the supplier of the surrounding system would like to customize its own command language. Thus, a protocol converter is required to adapt the frequency converter to the surrounding system. If the protocol converter is a separate device or an accessory card with processors, this means a significant increase in the costs. On the other hand, if there is no protocol converter or if it is integrated into the frequency converter or the surrounding system, the frequency converter or the surrounding system have to be manufactured case-specifically, which makes long production runs impossible.

BRIEF DESCRIPTION OF THE INVENTION

An object of the invention is to provide a frequency converter that solves the above incompatibility problem and thus improves the modifiability of the frequency converter while retaining the cost advantages brought about by long production runs. The object of the invention is achieved with a frequency converter according to claim 1. The dependent claims relate to preferred embodiments of the invention.

The invention is based on the idea that for application-specific customization it is possible to install in a frequency converter such application software that provides one or more functions to be called by basic software and/or calls one or more functions of the basic software. A function refers here to any callable software routine. In other words, the frequency converter comprises application-specific application software or at least a reserved memory area for the application software. The basic and application software call each other's functions indirectly via a call table having a respective link to each function included in the application software. The links may be addresses, unconditional or conditional jump commands, software interrupts or other corresponding structures. The location of each link in the call table is independent of the location of the corresponding function in the memory. When the basic software calls functions of the application software via links in fixed addresses, the application software can be compiled without knowing what the structure of the application software will be, which implements the modifiability that is the aim of the invention. Correspondingly, the basic software can be updated without causing any changes in those parts of the application software that call functions of the basic software.

In addition to the basic software calling functions of the application software, it is preferable if the basic software provides some functions of its own to be called by the application software. In order to make different call techniques compatible with each other, it is preferable to implement on the side of the basic software an intermediate layer, i.e. an adaptation layer, that standardizes all services visible to the outside to the same format. This adaptation layer may also control situations where the application calls functions that do not exist or are not available. This can be implemented with, for example, a software interrupt that controls the execution via an interrupt vector in a fixed location to a command interpreter, which routes the function call to the correct internal function. Modification of data to be returned is also preferably included in the services provided by the basic software. Modification of data may mean for instance scaling, format conversion or the like.

The application software may be installed on an auxiliary card, for instance, for which the frequency converter may comprise a memory location or a connector. Instead of or in addition to this, the basic software of the frequency converter may comprise a loading program for loading application software or a part of it via an external interface to a rewritable memory, such as a flash memory. The frequency converter preferably comprises interface means for connection to a field bus and/or controlling console (which may be a conventional computer), and the loading program may load the application software or a part of it via these interface means. The loading program may also copy the application software or a part of it from a detachable memory to a fixed memory. It is also preferable if the loading program is arranged to copy the application software or a part of it from the frequency converter to an external memory or interface, whereby the application software can be copied from one frequency converter to another or transferred to a program generation environment.

There is a plurality of alternative implementations in loading the application software. The application software can be loaded for example via the Internet to a computer, from which the software is loaded to a frequency converter via a local bus. Alternatively, the frequency converter may be provided with such a developed loading program that it is capable of fetching the new software versions itself, for instance via the Internet.

Also with regard to the processor and memory of the frequency converter, different implementations are feasible. If a non-volatile memory, such as a flash memory, is sufficiently fast for executing the software efficiently, the basic and application software can be executed directly from the non-volatile memory. In some processors, only an internal run memory, such as a RAM memory, is sufficiently fast for efficiently executing software, whereby the basic and application software stored in a non-volatile memory must be transferred from the non-volatile memory to the run memory (RAM)

after switching on the power. Transferring the programs to the RAM memory before the execution is also necessary if the software is self-modifiable.

It is also preferable if there is, in the memory of the frequency converter, space for a plurality of different pieces of application software, one of which is selected to be active at a time with some kind of mechanism. Thus, a new and an old program version can be tested in turns, or one of several alternative versions can be tested at a time. Information on the software that is active at each particular time can be indicated by means of configuration switches, stored in a non-volatile memory, etc.

BRIEF DESCRIPTION OF THE DRAWINGS

The invention will now be described in greater detail in connection with preferred embodiments, referring to the attached drawings, of which.

DETAILED DESCRIPTION OF THE INVENTION

Figure 1:
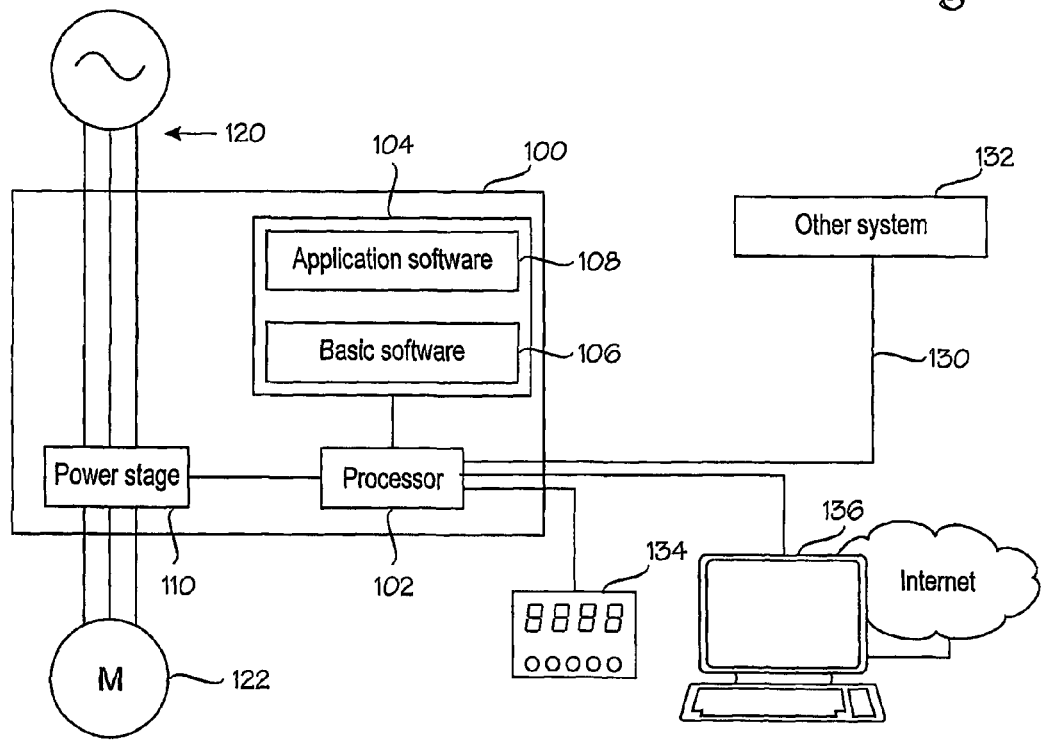
FIG. 1 shows a frequency converter in its typical operating environment as well as programming devices to be connected to the frequency converter.

FIG. 1 shows a frequency converter in its typical operating environment, as well as software devices to be connected to the frequency converter. A frequency converter 100 comprises a processor 102 and memory 104, in which basic software 106 is positioned in frequency converters according to the prior art. The memory of the frequency converter according to the invention further comprises application software 108 for application-specific customization. The frequency converter further comprises a power stage 110, which controls the supply of electricity from an electric network 120 to a consumption device 122, which is represented by an electric motor in FIG. 1. Alternatively, there may be a generator instead of the electric motor, whereby the frequency converter controls the transmission of electric power to the electric network 120. The frequency converter 100 is connected to a surrounding system 132 via interface devices, such as a field bus 130.

For the purpose of programming and/or configuration, control devices, such as a keyboard/display panel 134 or a computer/terminal 136 may be connected to the frequency converter 100. Because of software updates, the frequency converter preferably comprises a connection to the Internet, either via the computer 136 or independently of the computer.

The application-specific application software 108 and its interaction with the processor 102 and the basic software 106 are explained in greater detail in connection with FIG. 2. In other respects, the structure of the frequency converter 100 can be conventional and will not be explained in detail.

Figure 2:
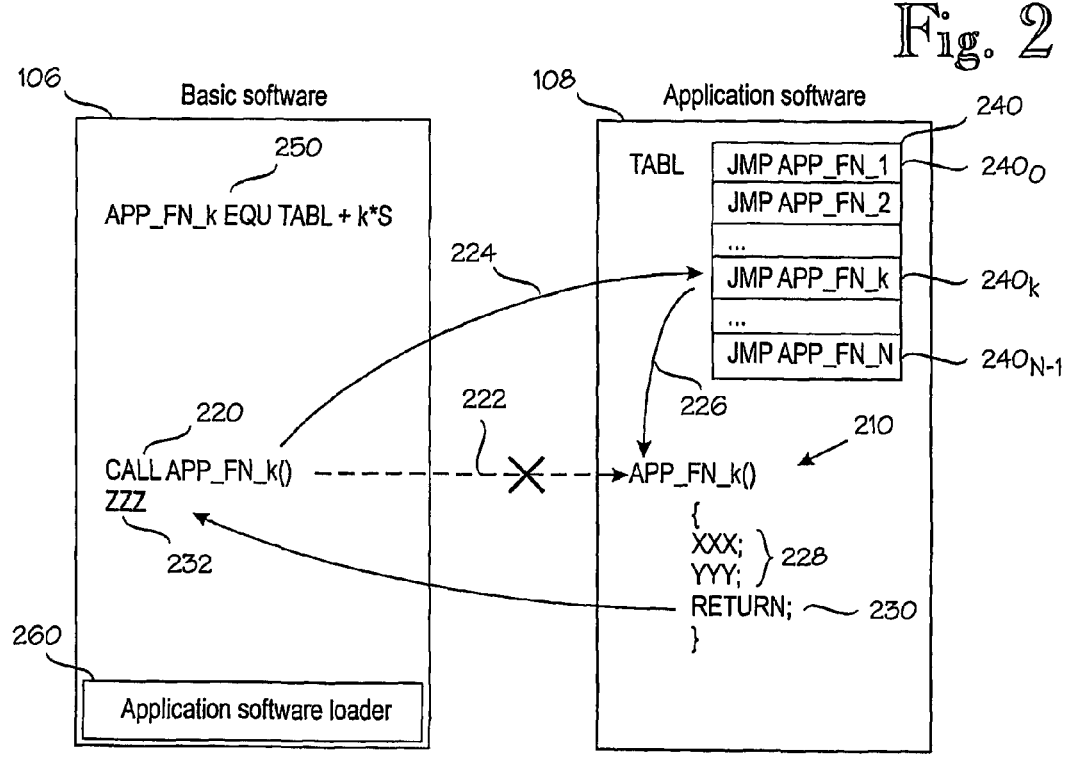
FIG. 2 shows interaction between basic software and application software in a frequency converter according to the invention.

FIG. 2 shows interaction between the basic software 106 and the application software 108 in a frequency converter according to the invention. The application software 108 comprises application-specific extensions. They are implemented as software routines that the basic software 106 calls when required. In the sense of this invention, all such routines included in the application software and callable from the basic software are referred to as functions, irrespective of which software-technical construction is used to implement them. In the context of high-level languages the term "functions" may be used, but on the level of a computer language, functions may be compiled as subsoftware calls.

In the example of FIG. 2, the application software 108 comprises a function 210, the symbolic name of which is APP_FN_k ("application function k"). Correspondingly, the basic software 106 comprises a call CALL APP_FN_k of this function, indicated by reference numeral 220. Thus, in this example, the same symbolic designation APP_FN_k is used in the name of the function 210 and in the call 220 of the function. When the basic software 106 and the application software 108 are compiled together, this common symbolic designation APP_FN_k is naturally compiled as the same physical address, whereby the function 210 could be called directly from the basic software, as indicated by an arrow 222. At the point of the CALL command or a corresponding structure the execution would move on to the physical address corresponding to the designation APP_FN_k, and at the point of the next RETURN command or a corresponding structure the execution would return to the command following the CALL command.

A problem arises when the basic software 106 and the application software 108 cannot be compiled together. Such a situation typically arises when the supplier of the frequency converter installs fixed basic software in the frequency converter and only leaves a space for the application-specific software 108 in the memory 104. In such a case, the creator of the basic software 106 does not know in which address the function APP_FN_k, 210, of the application software will be positioned, and the call 220 of the function cannot be compiled. This problem is indicated by the direct call 222 of the function 210 being drawn as a broken line and a cross being drawn over it.

One feasible solution would be to reserve a fixed amount of memory for each application software function to be called from the basic software. The problem with such a solution is, however, that the creator of the basic software does not have a clear conception of the memory space required by the application software functions, whereby space should be reserved for each function according to the worst possible prospect.

In accordance with the invention, the problem is solved in such a way that the call of the function 210 in the basic software 106 takes place indirectly via a call table 240. This indirect call is indicated by reference numeral 224. The call table 240 has a respective link for each function comprised by the application software and callable by the basic software. The links are indicated by reference numeral $240_i$, where i is the sequence number of the function. If the number of functions is expressed as N and the numbering begins from zero, the call table has links $240_0$ to $240_{N-1}$.

The sequence number of the example function 210 is k, whereby the call 224 moves the execution of the software to the address $240_k$. This is achieved for instance by positioning in the source-language version of the basic software a control line "APP_FN_k EQU TABL+k*S" indicated by reference numeral 250, which defines for the compiler that during the compilation of the basic software the address TABL+k*S corresponds to the symbolic designation APP_FN_k( ). Here, TABL is the initial address of the call table 240, k is the sequence number of the link corresponding to the function APP_FN_k( ) in the call table 240, and S is the amount of memory reserved for each link $240_i$ in the table. Thus, in the solution of the invention, a fixed amount of memory is reserved only for the link $240_i$ corresponding to each function, but the size of the function 210 itself can be freely decided by the creator of the application software (within the limits set by the size of the memory 104).

The call 224 thus moves the execution of the software to the link $240_k$ in the address $240_k$. In the example of FIG. 2, each link is a jump command to the initial address of the corresponding function 210. This jump is indicated by reference numeral 226. From there, the execution continues via a part 228 implementing the function to a return command 230 that returns the execution to a command 232 following the call 220 in the basic software 106.

Thus, at the compilation stage of the basic software, the compiler does not know the locations of the functions 210 in the application software 108, and this information could not even exist because the frequency converter according to the invention must support the implementation in which the application software 108 is installed in the frequency converter individually for each application. Instead, by means of the compiler's command lines 250, the compiler is informed at which point in the application software 108 there is a link $240_k$ to the corresponding function 210, this link location in the call table 240 being independent of the location of the corresponding function in the application software 108.

In contrast, the compiler of the application software does not need information of the type of the command line 250, but the call table 240 and functions 210 of the application software are compiled together, whereby the compiler can fill in the links $240_0$ to $240_{N-1}$ of the call table 240 with the initial addresses of the functions 210.

The location of the link $240_k$ being independent of the location of the corresponding function 210 in the application software 108 results in the call 220 of the function 210 also being independent of the location of the function 210 in the application software. In other words, irrespective of what kind of application software is installed in the frequency converter, the location of the function 210 in the application software does not affect the compilation of the basic software, and the basic software can be similar for all pieces of application software.

In the example of FIG. 2, each link is an unconditional jump command JMP (="jump") to the initial address of the corresponding function. The functions of the frequency converter include some critical basic functions whose execution must not be endangered by the application software not having been installed at all or by, for example, a wrong version having been installed by mistake. Therefore, it is preferable to implement a reasonableness check of the application software.

Figure 3:
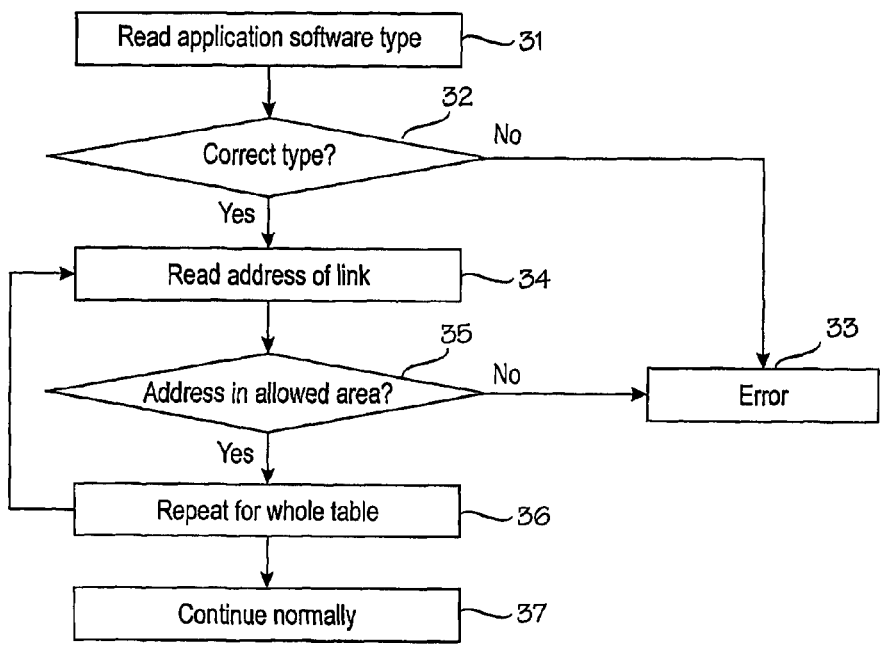
FIG. 3 shows a program routine for a reasonableness check of the application software.

FIG. 3 shows a program routine for a reasonableness check of the application software. The routine shown by FIG. 3 can be executed in connection with the start-up of the frequency converter, for example. In step 31, the type of the application software is read. For instance, it may be specified that at the beginning of the application software, there is specification information expressing what type of frequency converter this particular application software is intended for. In step 32, the correctness of this type information is tested with respect to this particular frequency converter. If the type is not correct, error processing follows, step 33. Depending on the situation, this may mean that the frequency converter does not start up at all or that only the basic software is executed but functions of the application software are not called. The step comprises reading the address of the first link $240_0$, i.e. the address to which the execution of the program is moved by the link. In step 35, it is checked whether the address is in the allowed area, which can be defined to be the memory area reserved for the application software. Step 36 ends the loop, in which steps 34 and 35 are repeated for all links of the table 240. If all links point at the allowed area, the procedure continues normally in step 37.

Figure 4:
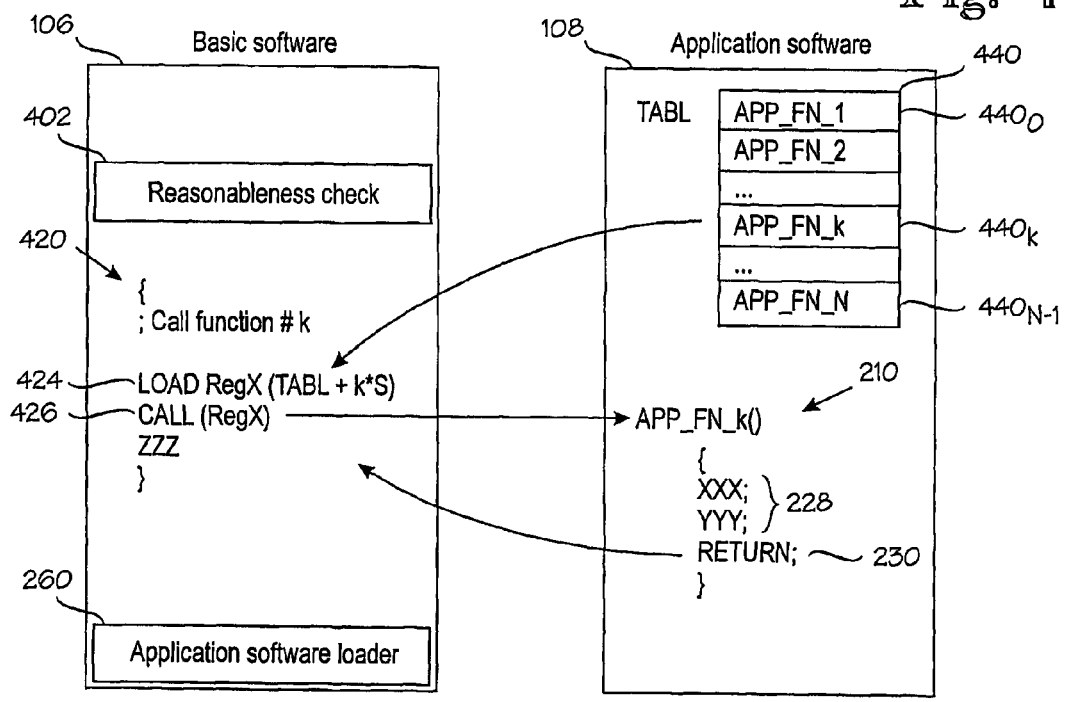
FIG. 4 shows a link structure in which a link is formed of a mere address.

FIG. 4 shows a link structure in which the link is formed of a mere address, and the actual jump command is positioned on the side of the basic software. In some processors, the jump command is always one byte, which is followed by a jump address, as shown in FIG. 2. In connection with such processors, it is easy to check that the link points at the allowed area. There are also processors in connection of which a jump, at least a jump directed to the vicinity, is encoded in the jump command itself, whereby it is difficult to fetch the address from the link table. In connection with such processors, it is preferable to implement the link table in such a way that a link is formed of a mere address and the actual jump command is positioned on the side of the basic software. A jump to the address pointed at by the link can be implemented with a software structure according to FIG. 4. The reference numerals smaller than 400 designate elements that have been explained in the context of the previous figures, so they will not be explained again.

In step 402, a reasonableness check of the application software is executed for instance in accordance with FIG. 3. In the embodiment of FIG. 4 the call table, i.e. the link table 440, differs from the table 240 of FIG. 2 in that the table of FIG. 4 includes only an address but no jump command. Reference numeral 420 points at the basic software's 106 program fragment, which calls function no. k. Reference numeral 424 designates a program command in which data is loaded to a register X from an address that is the address of the table 440 plus k times the length of each link. In other words, the address of the function k 210 is loaded to the register X in the application software. Reference numeral 426 indicates a command in which the processor executes a call to the address corresponding to the contents of the register X. After this, commands 228 of the function k are executed, until the function ends at the return command 230.

Figure 5:
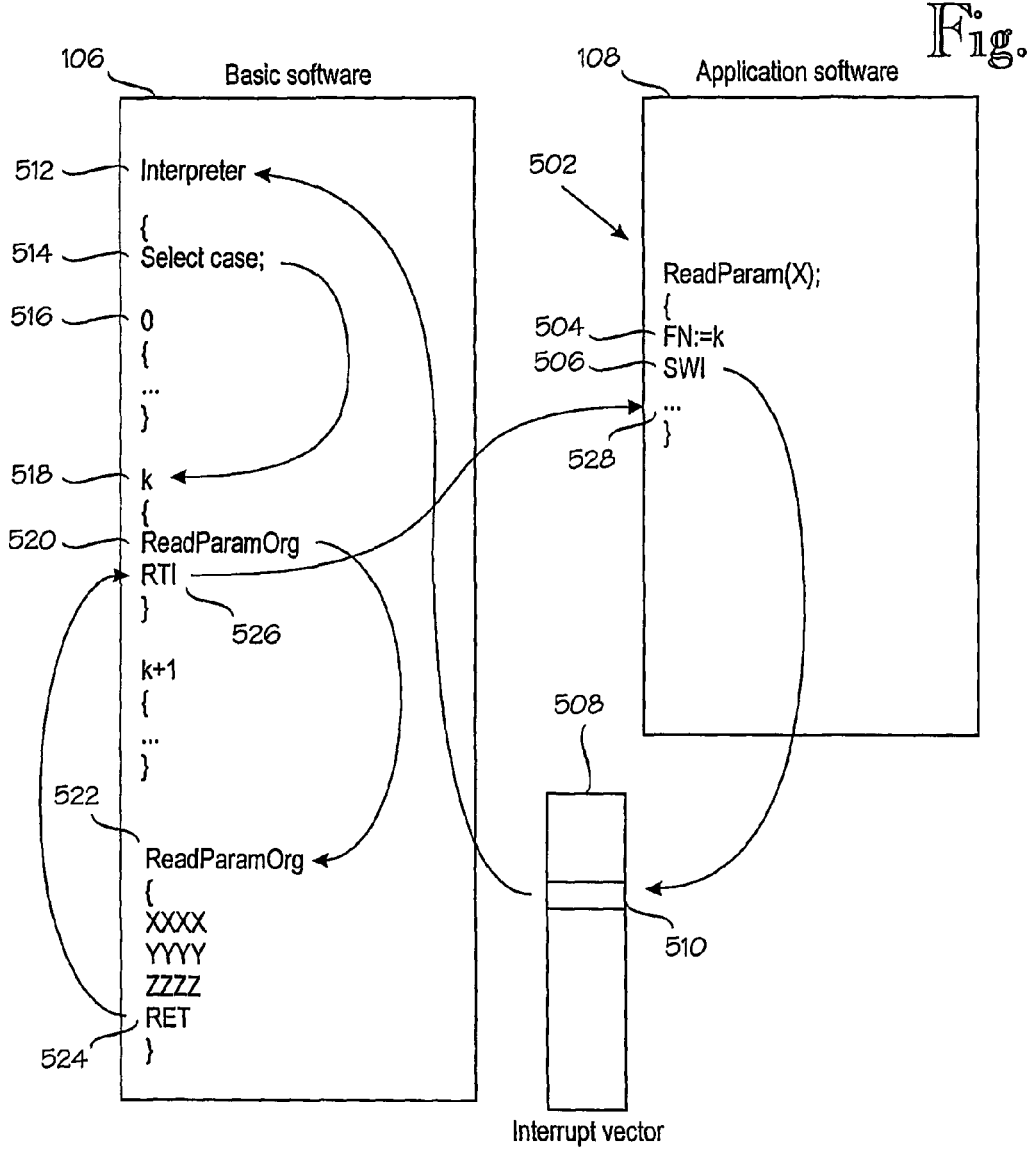
FIG. 5 shows an embodiment of a frequency converter in which the basic software provides its functions to be called by the application software.

FIG. 5 shows an embodiment in which the basic software provides its functions to be called by the application software. In this example, it is assumed that the application software comprises a routine 502 that uses functions to read parameters (ReadParam=Read Parameters). This function is not written in the application software but the routine 502 calls a function in the basic software. It can be thought that when the application software is customized, the structure of the basic software is fixed and the routine 502 of the application software could call a function of the basic software directly, as indicated by the arrow 222 of FIG. 2 (if the roles of the basic software and the application software are changed at the same time). However, this is not necessarily the case, because several versions of the basic software may be maintained, and it is preferable for the writer of the application software to utilize technology according to the invention, in which the address of the link is independent of the location of the function in the memory.

A function call could be implemented with techniques shown in FIG. 2 or 4, but FIG. 5 presents yet another alternative technique implementing the inventive idea that the call table comprises a respective link for each function comprised by the application software and callable from the basic software, the location of the link in the call table being independent of the location of the corresponding function.

The technique of FIG. 5 is based on the use of software interrupts. A command 504 loads the function number k to a register or memory location that depends on the conventions of the processor used. A command 506 executes a software interrupt. The software interrupt moves the execution of the program to an interrupt vector 508 and more specifically to an address 510 reserved for program interrupts, and via this address to the initial address 512 of the command interpreter of the interrupts. In this example, the command interpreter is implemented with a SELECT CASE structure beginning at point 514. Point 516 specifies the function if the number of the callable function is 0, but we are interested in point 518 that specifies the function if the number of the callable function is k. A command 520 calls a function ReadParamOrg (Read Parameters Original) 522, which is executed as far as to a return command 524. From the return command 524, the execution moves on to an RTI command that ends the processing of interrupts (Return from Interrupt), whereby the execution returns to a command 528 on the side of the application software.

Thus, FIG. 5 shows that it is preferable also for the application software to arrange a possibility to call functions of the basic software via links in standardized addresses, as well as a different embodiment for implementing the links. However, these matters are not closely connected to each other, but the link structure shown in FIG. 5 could also be used when the basic software calls functions of the application software, and the link structures shown in FIGS. 2 and 4 could be used when the application software calls functions of the basic software.

The application software 108 can be installed in the frequency converter in a plurality of different manners. One possibility is that the application software 108 is on a separate memory card that is positioned in a base or connector reserved for it. Instead of or in addition to this, rewritable memory (for instance flash memory) may be reserved for the application software 108, and the basic software 106 of the frequency converter may comprise a loading program for loading the application software via a data channel. Reference numeral 260 of FIG. 2 indicates such a loading program of the application software. As an example of data channels suitable for this purpose, a serial bus can be mentioned which may be wired or wireless (radio, microwave or optic/infrared connection) or a parallel data bus. For test and measurement use, what is called a JTAG (Joint Test Action Group) bus has been standardized which is one example of a wired serial bus that can also be used for transferring a program. In accordance with a preferred embodiment, loading of the application software takes place via the same field bus 130 via which the frequency converter 100 is connected to the surrounding system 132. In accordance with yet one preferred embodiment, the basic software 106 and the application software 108 are located in a fixed memory, the frequency converter comprises an interface for temporary attachment of a detachable memory, and the loading program 260 comprises a function for copying the application software from the detachable memory to the fixed memory. After the application software has been copied, the detachable memory can be removed. The advantage of this embodiment relates to the fact that frequency converters are subjected to environmental stresses, such as vibration and impacts, which are poorly withstood by detachable memories. By copying the application software from a detachable memory to a fixed memory, the whole memory employed during the use can be implemented as a fixed memory. In this context, a fixed memory does thus not mean the fixedness of the memory contents but firm attachment of the physical casing itself.

In accordance with yet one preferred embodiment, the loading program 260 also comprises a function for copying the application software between memory areas of the frequency converter, for instance between fixed memory areas, or from the frequency converter to an external memory or interface. The basic software may also comprise a separate loading program (not shown in the figure), which executes a reverse function for the loading program 260. The advantage of this embodiment relates to the fact that the application-specific customization of the application software is not necessarily optimal at first try, and there is a plurality of application software versions in use. Ideally, the creator of the program should keep a register of which program version has been installed in which frequency converter, but it may be the case that such registering has not been kept safe or has not been updated. If the application software can be copied from the frequency converter to an external memory, problem situations can be studied in a simulator, for example, or the software of a well-functioning frequency converter can be copied to another frequency converter.

In addition to providing a possibility to flexibly add application programs, the technique according to the invention allows synchronized execution of a function comprised by an application program in the middle of the execution of the basic software. For example, if a given sequence has been programmed in the basic software of the frequency converter, defining how a signal propagates from one module to another, the technique according to the invention allows opening of "worm holes" (more technically: execution possibilities of the application function) at any point of the execution chain of the basic software. In these worm holes, functions of the application software can be executed in which a signal can be modified as required. The advantage of this technique is that the modification of the signal gets executed synchronically, at exactly the optimal point of the execution chain.

The technique according to the invention also allows these "worm holes" to be positioned at a plurality of locations in the basic software, whereby the application programming includes versatile possibilities for customizing the basic software. In practice, it is desirable to keep the number of worm holes reasonable and to position them only at such points in the basic software to which they are naturally suitable and in which they can be positioned safely, for example to facilitate version compatibility.

The above description of the invention and its preferred embodiments are intended to illustrate the invention, not to restrict it. As noted above, the term "function" in the sense of the this invention refers to all callable program routines. In the example, a function is called with an explicit CALL command to increase clarity, but in many languages functions may be called with a mere name.

It is also obvious to a person skilled in the art that as the technology advances, the basic idea of the invention can be implemented in a plurality of ways. The invention and its embodiments are thus not restricted to the above examples but may vary within the scope of the claims.

The invention claimed is:

1. A frequency converter comprising:
   a processor; and
   memory storing basic software which when executed with the processor implements the basic functionality of the frequency converter, which comprises at least control of a power stage,
   wherein:
   the memory of the frequency converter is arranged to include application software that contains at least one callable function and is installable separately from the basic software;
   the frequency converter is arranged to execute the basic software and the application software with the the processor;

the basic software is arranged to call said at least one function of the application software and to provide at least one function of the basic software to be called by the application software indirectly via a link in a call table; and the location of said link in the call table is independent of the location of the function corresponding to the link in the memory.

2. The frequency converter according to claim 1, wherein the basic software comprises a routine to check the correctness of the application program.

3. The frequency converter according to claim 1, wherein the basic software comprises a loading program for loading the application software or a part of it.

4. The frequency converter according to claim 3, comprising interface means for connection to an external system and that the loading program is arranged to load the application software or a part of it via said interface means.

5. The frequency converter according to claim 3, wherein the loading program is arranged to copy the application software or a part of it from a detachable memory to a fixed memory.

6. The frequency converter according to claim 3, wherein the loading program is arranged to copy the application software or a part of it between fixed memory areas of the frequency converter.

7. The frequency converter according to claim 3, wherein the loading program is arranged to copy the application software or a part of it from the frequency converter to an external memory or interface.

8. The frequency converter according to claim 1, wherein each function of the application software is stored as an alternative piece of application software.

\* \* \* \* \*